Nov. 18, 1969            E. NIELSEN            3,478,598
METHOD OF INTRODUCING SUCCESSIVE LIQUID SAMPLES
INTO A CELL OF AN ANALYZING DEVICE AND
APPARATUS FOR CARRYING OUT THE METHOD
Filed Nov. 1, 1967

INVENTOR
Erik Nielsen

BY Watson, Cole, Grindle + Watson
ATTORNEYS ns # United States Patent Office 3,478,598
Patented Nov. 18, 1969

3,478,598
METHOD OF INTRODUCING SUCCESSIVE LIQUID SAMPLES INTO A CELL OF AN ANALYZING DEVICE AND APPARATUS FOR CARRYING OUT THE METHOD
Erik Nielsen, Albertslund, Denmark, assignor to H. Struers Chemiske Laboratorium, Copenhagen, Denmark
Filed Nov. 1, 1967, Ser. No. 679,730
Claims priority, application Denmark, Nov. 3, 1966, 5,725/66
Int. Cl. G01n 1/14
U.S. Cl. 73—423      4 Claims

ABSTRACT OF THE DISCLOSURE

To analyze a series of liquid samples, these are successively sucked into an analyzing cell such as a cuvette, where an analyzing operation is performed, whereafter the liquid is again expelled. For sucking in and expelling the liquid a piston pump is used, and according to the invention the piston of this pump is caused to suck in an amount of air prior to sucking in a liquid sample, and to expel this air after expelling the liquid, thereby to remove residual liquid.

BACKGROUND OF THE INVENTION

This invention relates to a method of introducing successive liquid samples into a cell, such as a cuvette, of an analyzing device of the kind, in which a liquid sample is sucked from a sample container through a sampling tube into the cell by means of a piston pump and is pressed back into the sample container after having been analyzed in the cell.

In a known method of the type referred to an analyzing cell is used, which consists of a cylindrical glass tube having a plane bottom and being closed by means of a plug through which two tubes extend. One of these tubes opens into the analyzing cell immediately above the bottom of said cell and is connected to a flexible tube, the free end of which may be lowered into sample containers, in which liquid samples are present. The other tube opens into the cell immediately below the plug and is connected with the piston pump.

When the free end of said flexible tube is immersed into a liquid sample and the piston of the pump is then retracted, liquid is sucked into the analyzing cell. When the sucked-in liquid sample has been subjected to an analysis, e.g. a spectographic determination, the liquid is pressed back into the sample container by advancing the piston of the pump. In carrying out this method, it is unavoidable that some of the liquid sample remains in the cell and in the flexible tube. When a new liquid sample is sucked into the cell, the residual liquid remaining from the beforegoing analysis will mix with the new sample, whereby grave errors may occur in the test results.

It is the object of the invention to eliminate or minimize such errors without the necessity of performing any operations.

SUMMARY OF THE INVENTION

According to the invention, the piston of the pump is retracted some distance before the cell is put in communication with the sample container, and is advanced some distance after the sucked-in sample has been pressed out of the cell.

By retracting the piston of the pump some distance before the sampling tube is introduced into the liquid sample, an excess quantity of air is introduced into the system, and when the liquid sample has subsequently been pressed back into the sample container by advancing the piston, this air is blown through the cell and the sampling tube whereby residual liquid is expelled.

In a preferred mode of carrying out the method, the sampling tube is descended abruptly into the sample container. Hereby the advantage is obtained that variations of the liquid level in the sample containers resulting from variations of the amount of liquid present in the sample containers or of the diameter of the latter will have no influence on the quantity of air sucked into the cell before the liquid sample is sucked in. Therefore, such variations will not substantially affect the accuray of the tests.

To facilitate the expelling of liquid drops adhering to the inner side of the flexible tube, the latter is preferably made of polymerized tetrafluorethylene.

The invention also relates to a suitable apparatus for carrying out the method. The apparatus comprises a piston pump connected through an analyzing cell of an analyzing device with a sampling tube for sucking in a liquid sample, and according to the invention it further comprises means for retracting the piston of the pump some distance before said tube is immersed into the liquid sample, and for advancing the piston a further distance after the sucked-in liquid sample has been pressed out of the cell.

In a preferred embodiment of the invention, the apparatus comprises means for abruptly lowering the sampling tube into a container in which the liquid sample is present.

The cell may advantageously be constructed with two pipe stubs opening into the cell at the top and at the bottom thereof respectively, the former being connected with the piston pump and the latter being connected with the sampling tube.

By this arrangement the advantage is obtained that the liquid is more completely removed from the cell through the pipe stub opening at the bottom thereof than when using the above mentioned known cell, from which complete removal of liquid is not possible, because the tube through which the liquid is to be expelled, must necessarily be arranged at a small distance above the bottom of the cell, which as mentioned is plane.

In the case of an apparatus, in which the piston pump is driven by a motor, the apparatus may advantageously comprise first actuating means for introducing the sampling tube into the sample container, a turntable for holding a plurality of sample containers, second actuating means for rotating said turntable stepwise to successively place the sample containers held thereby in position under said sampling tube, said first and second actuating means being driven synchronously with the piston pump by means of said motor.

By means of such an apparatus, liquid samples present in the containers received in the turntable will automatically be successively introduced into the cell of the analyzing device. If the analyzing device is moreover constructed to perform analyses and to record the results in a continuous or intermittent manner, series of analyses may be carried out without any manual operation.

The method and the apparatus according to the invention are particularly useful in carrying out optical analyses, e.g. spectrographic tests, determinations of fluorescence and optical absorption. They may, however, also be used in combination with other analyzing devices e.g. for determining pH-value.

If, in connection with such tests, washing of the cell after each test is required, this may also be obtained by means of the apparatus according to the invention, if every second sample container is filled with a washing liquid.

DESCRIPTIN OF THE PREFERRED EMBODIMENT

Figure 1:
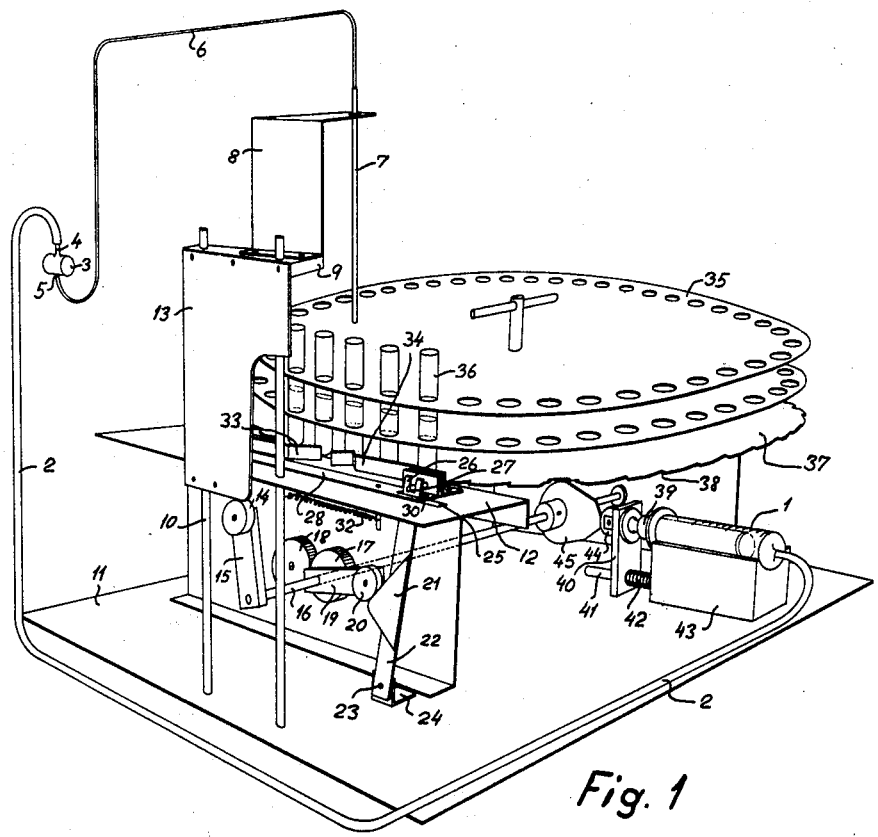
FIG. 1 is a perspective view of one constructional form of an apparatus according to the invention, certain parts having been removed to improve the illustration, and FIG. 2 one constructional form of a cam forming part of the apparatus illustrated in FIG. 1.

In the drawing, 1 is a piston pump, which by means of a flexible tube 2 is connected with a cuvette 3. The flexible tube 2 is connected to a pipe stub 4 opening into the cuvette 3 at the top thereof. A flexible tube 6 is connected at one end to another pipe stub 5 opening into the cuvette 3 at the bottom thereof, and at its other end to a rigid tube 7. The tube 7 is attached to a holder 8, which is mounted on a block 9 having two holes through which extend two guide rods 10, which are mounted on a base 11 and extend through a table 12. Attached to the edge of the block 9 is a cam plate 13 constructed with an incision at one side. The cam plate 13 cooperates with a roller 14 mounted on an arm 15 on a shaft 16. The shaft 16 carries a gear 17 meshing with a second gear 18, which is connected with the shaft of a gear motor, not shown. The shaft 16 also carries an arm 19, at the outer end of which a roller 20 is mounted. The roller 20 engages the cam face of a cam 21, which is attached to a rocking lever 22 pivoted at 23 to a holder 24 attached to the base 11.

The table 12 has a slot 25, through which the upper portion of the rocking lever 22 extends. This portion of the rocking lever is constructed as a fork 26, in which a pin 27 attached to a slide 28 is received. The slide 28 is arranged parallel to and above the slot 25. The slide 28 has a hole 30, through which the rocking lever 22 extends. On the underside of the slide a pin 31 is provided, to which there is attached one end of a coil spring 32, the other end of which is connected to a stationary part of the apparatus.

At the end of the slide 28 remote from the hole 30 a leaf spring is attached which is constructed with a bent portion 33 at its free end.

Another leaf spring 34, the free end of which is shaped as a V, is attached to the table.

The apparatus also comprises a turntable 35 for sample containers 36. The turntable 35 has a plate 37 which supports the sample containers 36, and the edge of which is constructed with a number of notches 38 corresponding to the number of sample containers 36 placed in the turntable 35.

The piston pump 1 has a piston rod 39, which is attached to a vertical plate 40, through the lower portion of which a guide rod 41 extends. The plate 40 is slidable on the guide rod 41 and is urged to the left by a coil spring 42 surrounding the guide rod 41, said coil spring 42 being interposed between the plate 40 and a support 43 of the piston pump 1. At the side of the plate 40 remote from the piston rod 39 a roller 44 is mounted, which abuts the cam face of the cam 45 secured to the shaft 16.

The operation of the apparatus is as follows:

When the shaft is rotated by the motor, not shown, in the clock-wise direction from the position shown in the drawing, the piston rod 39 will be retracted because the coil spring 42 makes the roller 44 follow the contour of the cam 45 so that during the first part of a revolution the roller 44 will approach the shaft 16. Owing to the retraction of the piston rod 39 thus produced air is sucked through the tube 7 into the flexible tubes 2 and 6 as well as the cuvette 3.

During the said rotation of the shaft 16, the cam 21, which is urged against the roller 20 by the spring 32, will be urged to the right and will thereby displace the slide 28 to the right. During this movement of the slide 28 the leaf spring 33, the outer portion of which is pressed towards the plate 37, engages a notch 38 of this plate and causes the plate 37 and thereby the whole of the turntable 35 to move. When the roller 20 reaches the tip of the cam 21, a sample container 36 is in position directly under the tube 7. During continued movement of the arm 19, the slide 28 with the spring 33 is pulled to the left by the spring 32, but at the same time the V-shaped portion of the leaf spring 34, which is also urged towards the edge of the plate 37, engages a notch 38 and thereby holds the turntable 35 in the position, at which it has arrived. During rotation of the shaft 16, the roller 14 on the arm 15 reaches the incision of the cam plate 13, and the latter will therefore descend abruptly, the block 9 sliding along the guide rods 10. Thereby the tube 7 is abruptly descended into the sample container 36 present thereunder.

This abrupt immersion of the tube 7 into the liquid sample has the advantage that variations of the liquid level in the sample container will not have any substantial influence on the quantity of air sucked into the cuvette 3 before the liquid is sucked in. As a further consequence of this, the blow-off of residual liquid from the flexible tube 6 and the tube 7 will also be independent of the said variations, which will therefore not have any substantial influence on the accuracy of the tests.

Since the piston rod 39 continues to move to the left, liquid will be sucked into the cuvette 3. The volume of the cuvette 3 is so selected that the desired quantity of liquid has been introduced when the roller 44 arrives at the portion of the cam 45 having a circular contour. During the continued rotation of the shaft 16, no displacement of the piston rod 39 takes place. During this time, the liquid sample introduced into the cuvette 3 is subjected to a test.

During the further continued rotation of the shaft 16, the cam 45 urges the piston rod 39 back, whereby liquid is pressed out of the cuvette 3. At the time when the sucked-in liquid has been returned to the sample container 36, the piston will still be some distance removed from its bottom position and during the continued movement air will therefore be blown through the cuvette 3, the flexible tube 6 and the tube 7.

At this time, the cam 15 and the holder 8 for the tube 7 has been lifted from the bottom position by engagement of the roller 14 with the bottom edge of the cam plate 15. Shortly before the holder 8 has reached its top position, the roller 2 on the arm 19 engages the cam 21, whereby the turntable 35 is rotated in such a manner that the next following sample container 36 is placed in position under the tube 7.

During each subsequent revolution of the shaft 16, the described operations will be repeated.

A particular advantage of the apparatus shown is that the quantity of the liquid sucked into the cuvette can be varied just by replacing the cam 45 with a cam having another contour. Hereby the apparatus may easily be readjusted in such a manner that it may be used in combination with testing devices requiring different quantities of the liquid sample to perform a test.

Likewise, the apparatus may easily be readjusted for use in combination with a greater or a smaller number of sample containers that may have a different diameter, all that is necessary in such cases being to exchange the turntable.

Figure 2:
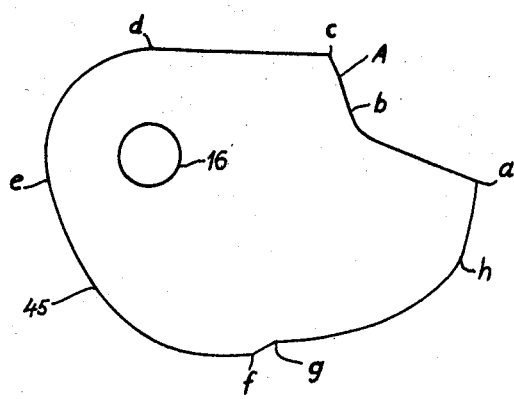

A particularly advantageous form of the contour of the cam 45 is illustrated in FIG. 2. Point a of the contour represents the same starting position of the apparatus as that illustrated in FIG. 1, and point b represents the position to which the piston of the pump 1 is retracted prior to the introduction of the tube 7 into a sample container 36. From point b to point c the radius of the contour of the cam is constant, and consequently the piston of the pump 1 is not further retracted during the angular movement of the shaft 16 corresponding to the portion b–c of the cam contour. The arm 15 is mounted in such an angular position relative to the shaft 16 that release of the cam plate 13 and consequently introduction of the tube 7 into a sample container 36 takes place at a point A between b and c. From c to d, the cam contour has a decreasing radius so that the piston of the pump 1 is again retracted, this time to suck in liquid. From $d$ to $e$ the cam contour has a constant radius so that the piston of the pump 1 remains stationary. This is the angular interval used for carrying out the test. From $e$ to $f$ the radius of the cam again increases so that the piston of the pump 1 is moved to the right to expel liquid from the cuvette. Then follows a small interval $f$ to $g$ where the radius of the cam contour is again constant and the piston of the pump consequently remains stationary. During this interval, the small amount of liquid still present in the cuvette is allowed to collect to a drop at the exit of the cuvette. From $g$ to $h$ the cam contour has again an increasing radius so that the piston of the pump 1 is moved to the right, this time to expel air. Finally follows the interval $h$ to $a$ of constant radius where pressure equalization takes place between the cuvette 3 and the surrounding atmosphere.

It will be noted that when using the cam illustrated in FIG. 2, the piston of the pump 1 remains stationary while the tubes 7 is lowered into a sample container. Consequently, the change-over from the sucking-in of air to the sucking-in of liquid is no longer dependent on the exact moment when the tip of the sampling tube 7 reaches the liquid level in a sample container 36. On the contrary, the sucking-in of air is terminated and the sucking-in of liquid initiated in a definite position of the piston of the pump 1, viz, that corresponding to points $b$ and $c$ of the cam contour. All that is necessary for this purpose is that the sampling tube does become immersed during the interval $b$–$c$. If desired, the movement of the sampling tube 7 into a sample container 36 may even be made less abrupt if the angular intervals $b$–$c$ is made great enough.

I claim:
1. An apparatus for analyzing successive liquid samples, comprising an analyzing cell, a sampling tube communicating with one zone of said analyzing cell, a piston pump communicating with another zone of said analyzing cell, sampling tube operating means for introducing said sampling tube into successive sample containers and removing it therefrom, pump operating means for retracting and advancing the piston of said piston pump, said sampling tube operating means and said pump operating means being mutually synchronized so as to perform an operating cycle comprising introduction of said sampling tube after commencement of the retraction stroke of said piston and removal of said sampling tube before completion of the advancing stroke of said piston.

2. An apparatus for analyzing successive liquid samples, comprising an analyzing cell, a sampling tube communicating with one zone of said analyzing cell, a piston pump communicating with another zone of said analyzing cell, sampling tube operating means for introducing said sampling tube into successive sample containers and removing it therefrom, pump operating means for retracting and advancing the piston of said piston pump, said sampling tube operating means and said pump operating means being mutually synchronized so as to perform an operating cycle comprising abruptly introduction of said sampling tube after commencement of the retraction stroke of said piston and removal of said sampling tube before completion of the advancing stroke of said piston.

3. An apparatus for analyzing successive liquid samples, comprising an analyzing cell, a sampling tube communicating with one zone of said analyzing cell, a piston pump communicating with another zone of said analyzing cell, sampling tube operating means for introducing said sampling tube into successive sample containers and removing it therefrom, pump operating means for retracting and advancing the piston of said piston pump, said sampling tube operating means and said pump operating means being mutually synchronized so as to perform an operating cycle comprising a two-step retraction stroke and a subsequent advancing stroke of said piston, introduction of said sampling tube between the two retraction steps of said piston, and removal of said sampling tube before completion of the advancing stroke of said piston.

4. An apparatus as in claim 3, characterized in that said pump operating means comprises a piston actuating cam, which comprises in the following succession: a portion of decreasing radius to initially retract the piston of the pump prior to the introduction of the sample tube into a sample container, a portion of constant radius to keep the piston stationary during introduction of the sampling tube into the sample container, a portion of decreasing radius to suck in liquid, a portion of constant radius defining a time interval for analyzing, a portion of constant radius to allow residual liquid in the cell to collect into a drop, a portion of increasing radius to expel air, and a portion of constant radius to permit pressure equalization to take place between the cell and the surrounding atmosphere.

References Cited
UNITED STATES PATENTS

| | | | |
|---|---|---|---|
| 3,142,719 | 7/1964 | Farr | 73—423 X |
| 3,178,266 | 4/1965 | Anthon | 23—253 |
| 3,225,645 | 12/1965 | Baruch | 88—14 |
| 3,236,602 | 2/1966 | Isreeli | 88—14 |
| 3,376,751 | 4/1968 | Junger | 73—423 |
| 3,263,554 | 8/1966 | Pickles | 73—425.6 |

S. CLEMENT SWISHER, Primary Examiner

U.S. Cl. X.R.

356—246